United States Patent [19]
Knudsen et al.

[11] 3,724,491
[45] Apr. 3, 1973

[54] REMOVABLE VALVE INSULATION AND COVER

[76] Inventors: Kai Knudsen, 947 Provencher Boulevard; Bent Knudsen, 465 Valery St., both of Ville Brossard, Canada

[22] Filed: Apr. 5, 1971

[21] Appl. No.: 131,174

[30] Foreign Application Priority Data

Apr. 6, 1970 Canada..................................079359

[52] U.S. Cl..................................137/375, 138/149
[51] Int. Cl...............................................F16l 59/16
[58] Field of Search......................137/375; 138/149

[56] References Cited

UNITED STATES PATENTS

| 616,127 | 12/1898 | Mergenthaler | 138/149 |
|---|---|---|---|
| 3,559,694 | 2/1971 | Volberg | 138/149 X |
| 1,108,840 | 8/1914 | Franke | 137/375 X |
| 3,367,358 | 2/1968 | Rentschler | 137/375 |
| 3,556,158 | 1/1971 | Schneider | 138/149 |

Primary Examiner—William R. Cline
Attorney—Alan Swabey

[57] ABSTRACT

An insulating shell for a valve made up of a plurality of sections which mate together about the valve and each section has inner and outer skins with insulation material between the skins.

3 Claims, 6 Drawing Figures

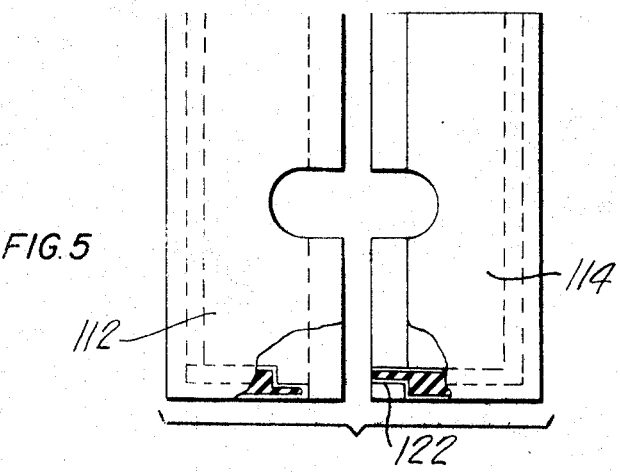
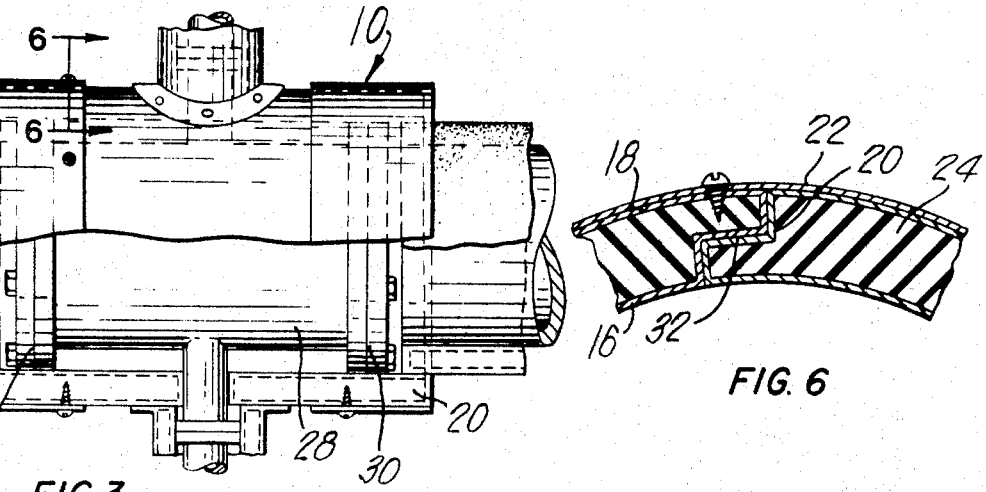
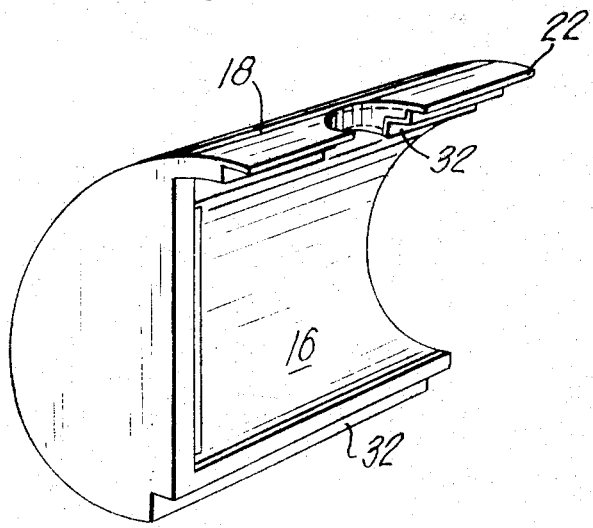

REMOVABLE VALVE INSULATION AND COVER

BACKGROUND OF INVENTION

1. Field of Invention

The present invention relates to valve insulation and covers, and more particularly to a valve insulation and cover which can be easily removed from a valve for maintenance or inspection purposes and then reassembled about the valve.

2. Description of Prior Art

Heretofore, many insulation covers have been proposed for valves and similar pipe joints, wherein there is provided a formed metallic cover, which is adapted to contain insulation either in powder of other form against the valve. An example of this is U.S. Pat. No. 1,108,840, Franke, 1914, which shows two covered sections into which is provided the powder insulation for fitting about the valve. However, when it is necessary to inspect or maintain the valve, though the cover can be easily removed, the insulation normally falls away or must be scraped off the valve and then, when it is required to replace the cover, new insulation must be supplied within the so-formed jacket.

SUMMARY OF INVENTION

It is an aim of the present invention to provide an insulation and cover for a valve which can be easily removed and reassembled about the valve without having to manipulate the insulation, that is, by removing it and/or replacing it when the cover is reassembled.

In accordance with the present invention, a removable valve insulation and cover comprises a shell made up of a plurality of mating sections adapted to cover a valve, each section including an outer metallic sheeting and an inner metallic sheeting connected to the outer metallic sheeting and defining a space therebetween, insulation material provided in the so-formed space between the inner and outer metallic sheeting; each section having a portion of the metalic sheeting adapted to overlap on an adjacent section, and each said section being removably connected to said adjacent section.

BRIEF DESCRIPTION OF THE DRAWINGS

Having thus generally described the nature of the invention, it will now be illustrated with particular reference to the accompanying drawings which show by way of illustration preferred embodiments thereof, and in which:

FIG. 3 is a side elevation partly cut away showing the assembled insulated cover on a typical valve;

FIG. 4 is a perspective view of a section of another embodiment of the insulation cover;

FIG. 5 is a schematic view of two insulation cover sections illustrating a detail of the connection between them; and FIG. 6 is an enlarged fragmented section taken on Line 6—6 of FIG. 3.

Figure 1:
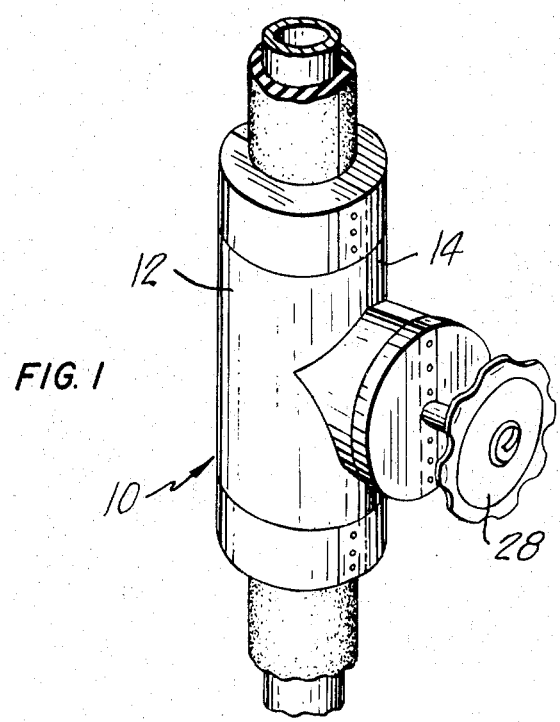
FIG. 1 is a perspective view of an insulation cover mounted about a typical valve.

A typical embodiment of the insulation cover is shown in FIG. 1, identified 10. The cover shown in FIG. 1 includes a section 12 and a section 14 which are connected together to envelope the valve, not shown.

Figure 2:
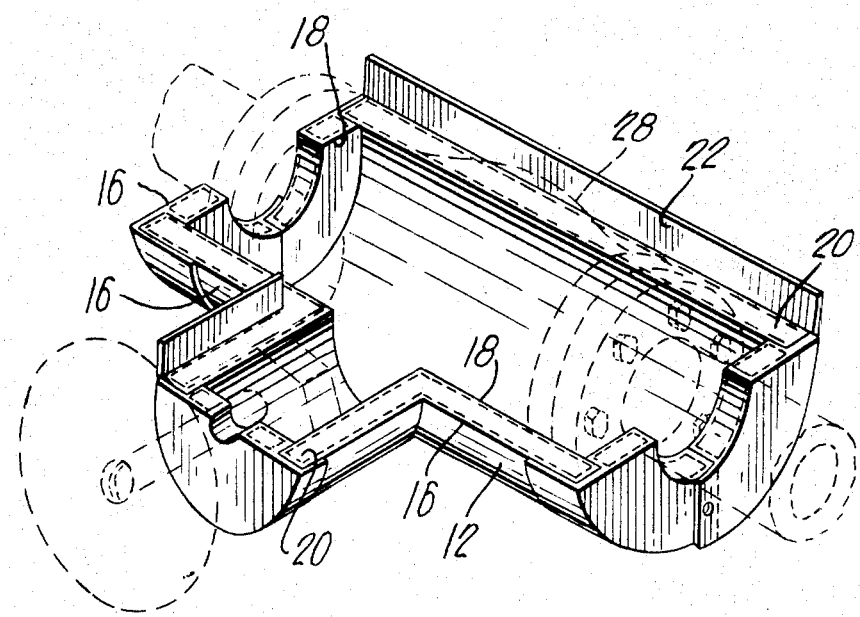
FIG. 2 is a perspective view of one section of the insulation cover removed from the valve.

Each section shown in FIG. 2 can be made of an outer wall 16 and an inner wall 18 defining a space between the walls. The inner wall 18 and the outer wall 16 are of similar configuration and are connected together, as by forming end walls 20 continuous with the inner and outer walls 16 and 18.

The walls 16 and 18, as well as 20 could be a relatively thin metallic sheeting which can be easily formed to the required shape. Insulation 24 is provided in the space formed between the walls 16 and 18.

In the present embodiment, shown in FIGS. 1 and 2, an overlap flange 22 of the outer wall 16 is provided which is adapted to overlap on the similar section 12, for instance, and be connected thereto by conventional connecting means.

FIG. 3 shows the relationship of a typical embodiment of the invention in which the shell of the insulating cover 10 is cut away to show the exchanger head which it is covering. An exchanger head 28 normally has flanges 30 and as can be seen in FIG. 3, the shell of the insulating cover 10 is not necessarily contoured about the various parts of the exchanger head, but in making the insulation shell, the largest diameters or dimensions of the exchanger are considered and the shell is made or molded to cover the portions of largest diameter. Since the insulation 24 in the shell is completely encased between the inner and outer walls 16 and 18, there is no fear of the insulation material 24 being displaced at any portion of the exchanger head even though the shell does not fit the exact contours thereof.

A further embodiment of the insulation cover shell 10 is shown in FIG. 4, wherein the insulation 24 is considerably thicker than that shown in the earlier embodiments and the end mating wall is shown as being stepped at 32 and the overlap flange 22 overlaps an adjacent cover section while the stepped portion 32 engages a similar stepped portion in the adjacent section.

FIG. 5 illustrates a further manner of connecting the sections together whereby a staggered joint construction is shown with a projection 122 extending from the insulating cover section 112 fitting to the adjacent section 114 and engaging on the inside of the shell against the end wall.

In all of the embodiments shown, the main feature is that the insulation material 24 is completely encased within the inner and outer walls, and each section can be disconnected from each other and removed as an integral unit including the insulation material 24 from the valve, whereby the valve can be examined or maintained and then the insulation sections are simply reunited together over the valve when it is required to again cover the valve.

We claim:

1. A removable fitting insulating shell comprising at least two mating sections adapted to completely cover the fitting, each section including an outer metallic sheeting and an inner metallic sheeting wall and mating walls about the edges thereof forming an enclosure, insulation material in the enclosure so formed by the sheeting walls, the mating walls being stepped such that there are at least three portions of each mating wall perpendicular to each other thereby reducing the amount of heat conduction through the mating walls; each section having means adapted to be connected with an adjacent section when the sections are mounted to form a complete insulating shell about a fitting.

2. A removable fitting insulating shell as defined in claim 1, wherein the inner metallic sheeting fits the contours of the largest diameters of the fitting.

3. A removable fitting insulating shell as defined in claim 1, wherein said connecting means is a portion of said outer metallic sheeting wall, extending beyond the limits of the section adapted to overlap the adjacent section mounted together to form the cover.

* * * * *